United States Patent [19]
Sweet et al.

[11] 3,970,293
[45] July 20, 1976

[54] SUSPENSION SYSTEM

[75] Inventors: Philip J. Sweet; Buck C. Hamlet; David L. Sweet, all of Fresno, Calif.

[73] Assignee: American Carrier Equipment, Fresno, Calif.

[22] Filed: Jan. 31, 1975

[21] Appl. No.: 546,189

Related U.S. Application Data

[63] Continuation-in-part of Ser. No. 401,241, Sept. 27, 1973, Pat. No. 3,866,894.

[52] U.S. Cl. ............................. 267/31; 280/712; 267/18
[51] Int. Cl.² ..................................... B60G 11/44
[58] Field of Search ................... 267/31, 18, 32, 56, 267/65 R, 8 R, 8 C; 280/124 F, 24.02; 105/197 B, 453

[56] References Cited
UNITED STATES PATENTS 3,063,732  11/1962  Harbers et al. ................. 280/124 F
3,294,390  12/1966  Warmkessel ......................... 267/31

*Primary Examiner*—James B. Marbert
*Attorney, Agent, or Firm*—Huebner & Worrel

[57] ABSTRACT

An improved suspension system characterized by an axle, a leaf-spring assembly having a spring member extended transversely of the axle and mounted thereon, and an air-bag assembly interposed between the frame of a vehicle and one end of the leaf-spring assembly. The air-bag assembly includes a bracket disposed above the leaf-spring assembly and affixed to the frame, a pivotal arm having one end connected to the bracket in coplanar relation with the leaf-spring assembly, an expansible air bag formed of an elastomeric material interposed between the distal end of the pivotal arm and the frame of the vehicle, and a roller seated on the leaf-spring assembly and pinned to said armin fixed spatial relationship with the opposite ends thereof.

1 Claim, 6 Drawing Figures

SUSPENSION SYSTEM

CROSS REFERENCE TO RELATED APPLICATION

This application is a continuation-in-part application of Application Ser. No. 401,241, filed Sept. 27, 1973, now U.S. Pat. No. 3,866,894.

BACKGROUND OF THE INVENTION

The invention generally relates to suspension systems, and more particularly to an improved suspension system including an air-bag assembly and a leaf-spring assembly interconnected in a manner such that the suspension system is responsive to changes in the weight of a load for varying the configuration of the suspension system between a hard-ride configuration, wherein the bag is substantially collapsed, and thus rendered ineffective for absorbing shock loads, and an empty-ride configuration wherein the air bag is expanded for absorbing shock loads. The term hard-ride configuration, as herein employed, refers to a configuration for a vehicle suspension system wherein the air bag of the included air-bag assembly is collapsed and thus rendered inoperative for absorbing shock loads, while the term empty-ride refers to a configuration for the suspension system wherein the air bag is expanded and thus rendered operative for absorbing shock loads and thereby isolating, at least in part, the frame of the vehicle from highway induced vibratory motion transmitted thereto from the wheels of the vehicle.

As is readily recognized by those familiar with the design of suspension systems for vehicles such as trucks, trailers and the like, a suspension system should be sufficiently resilient for absorbing shock loads resulting from highway induced vibration. In order to achieve this result, it heretofore has been common practice to provide massive springs interposed between the load-bearing axles and the frames of such vehicles. While springs of sufficient rigidity can readily be provided, for supporting a vehicle in its loaded condition, by increasing the mass thereof, a perplexing problem arises when the vehicle must be transported in its unloaded or empty condition.

For example, it is not unusual for a trailer, such as a flatbed or the like, to be employed in transporting a load to a given destination and thereafter be returned in its empty condition. Of course, where the springs employed are sufficiently rigid for supporting the trailer in its loaded condition, the springs often lack sufficient resiliency for dissipating shock loads when the trailer is transported at high speed in its unloaded condition. Consequently, such vehicles often are subjected to destructive effects of shock loading, resulting from highway induced rebound, as the vehicles are transported in an unloaded condition.

Attempts have been made to solve this and similar problems employing various techniques including a use of leaf springs combined with air bags, frequently referred to as air springs. Such suspension systems are typified by the system disclosed in U.S. Pat. No. 3,309,107 and U.S. Pat. No. 3,294,390.

While these systems generally have met with varying degrees of acceptance, they have not provided a total solution to the problem, particularly since designers must continuously cope with problems arising out of limitations placed on bulk, mass and complexity due to economic considerations found in both the trucking and manufacturing industries.

It is, therefore, the general purpose of the instant invention to provide an improved and simplified suspension system capable of achieving automatic and positive conversion between hard-ride and empty-ride configurations, in response to changes in the weight of loads applied to the frame of a vehicle supported thereby.

OBJECTS AND SUMMARY OF THE INVENTION

It is, therefore, an object of the instant invention to provide an improved suspension system for vehicles.

It is another object to provide an improved suspension system which overcomes the aforementioned objections and disadvantages.

It is another object to provide an improved suspension system having an improved empty-ride capability.

It is another object to provide an improved suspension system which combines the desirable characteristics of an air-bag assembly and a leaf-spring assembly.

It is another object to provide a practical and economic suspension system for a highway vehicle such as a trailer or the like, having the capability of supporting a loaded vehicle in a hard-ride configuration, while possessing a capability for supporting the vehicle, in its unloaded condition, in an empty-ride configuration for dissipating highway induced shock loads.

These and other objects and advantages are achieved through the use of a simple and economic suspension system which includes a pivotal arm of an elongated configuration having one end pivotally connected to the frame of a selected vehicle and a second end portion thereof connected to a leaf-spring assembly through a roller pinned to the arm in a fixed spatial relationship with the end portions thereof and seated in supported rolling engagement on an end portion of the leaf-spring assembly and an air-bag assembly seated on said arm and disposed in supporting engagement with the frame of the vehicle, whereby the effective lever length of the arm remains substantially constant.

DESCRIPTION OF THE PREFERRED EMBODIMENT

Figure 1:
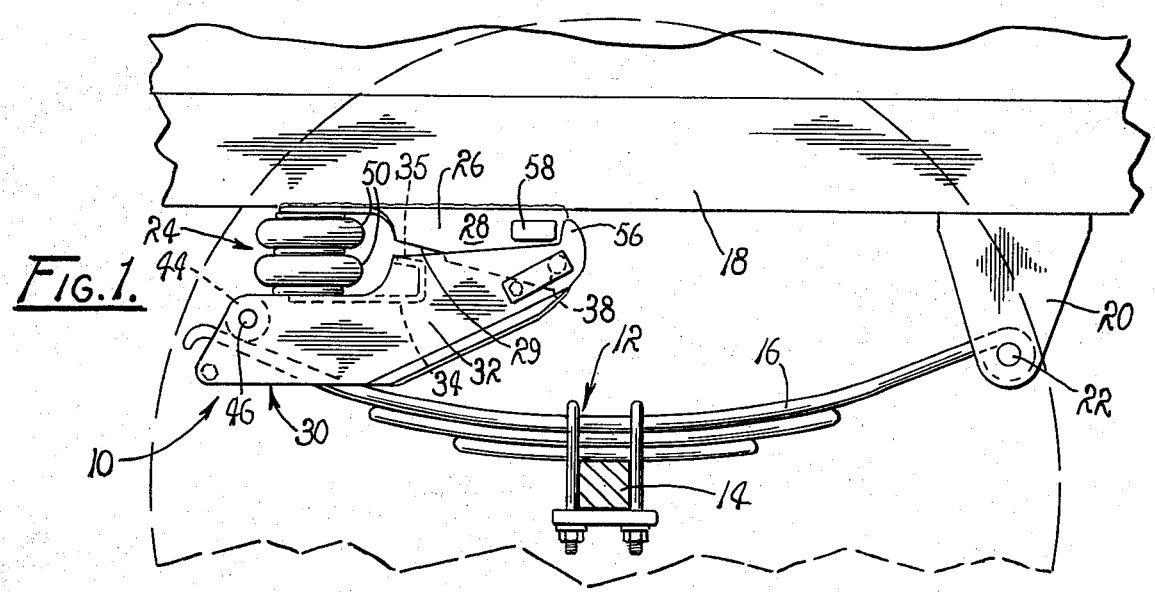
FIG. 1 is a fragmented elevational view of a suspension system which embodies the principles of the instant invention, including a leaf-spring assembly mounted on a wheel-supported axle and an air-bag assembly interposed between one end of the leaf-spring assembly and a frame of a vehicle supported thereby.
Figure 2:
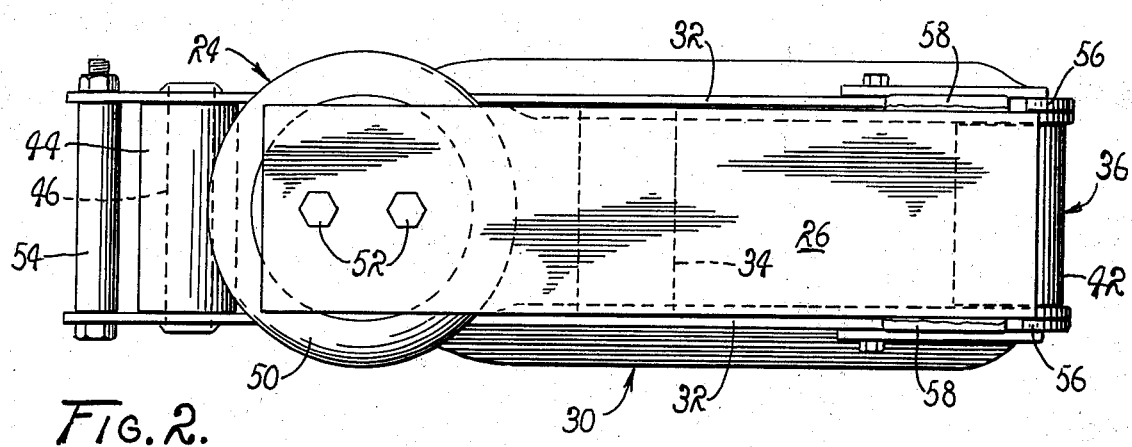
FIG. 2 is a top plan view of the suspension system shown in FIG. 1.
Figure 3:
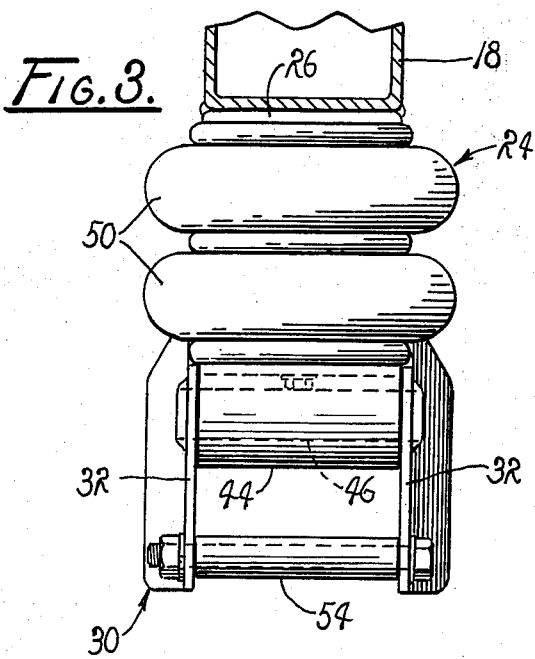
FIG. 3 is an end view of the suspension system with the leaf-spring assembly omitted for the sake of clarity.
Figure 4:
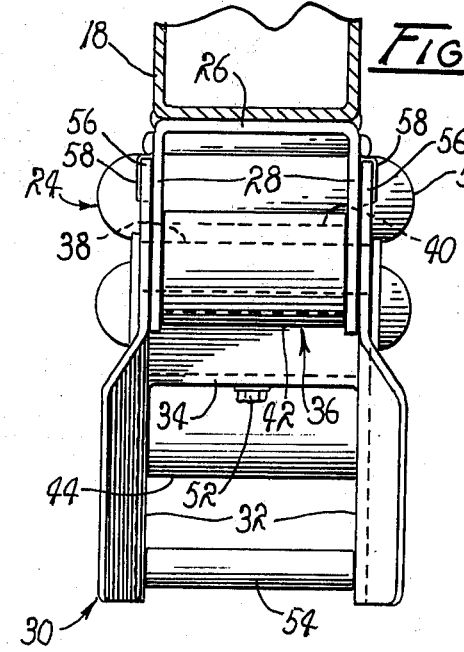
FIG. 4 is an end view, similar to FIG. 3, taken in a direction opposite to that in which the view shown in FIG. 3 is taken.

Referring now to the drawings wherein like characters designate like or corresponding parts throughout the several views, there is shown in FIG. 1 an improved suspension system, generally designated 10, which embodies the principles of the instant invention.

As illustrated, the suspension system 10 includes a leaf-spring assembly 12 mounted on an axle 14 provided for a wheel-supported vehicle, not shown. Since the leaf-spring assembly 12 is of a well known design, a detailed description is omitted for the sake of brevity. However, it is to be understood that the leaf-spring assembly 12 includes a plurality of flexible, suitably cambered spring members 16. Such members normally are of an arcuate configuration and are adapted to flatten for purposes of dissipating force and thus absorbing highway induced shock loads.

As shown, the leaf-spring assembly 12 is connected at one end to the frame 18 of a selected vehicle, not shown, through a hanger 20, suspended from the frame 18, and a knuckle joint 22, also of known design, which serves to couple the leaf-spring assembly with the hanger.

Figure 5:
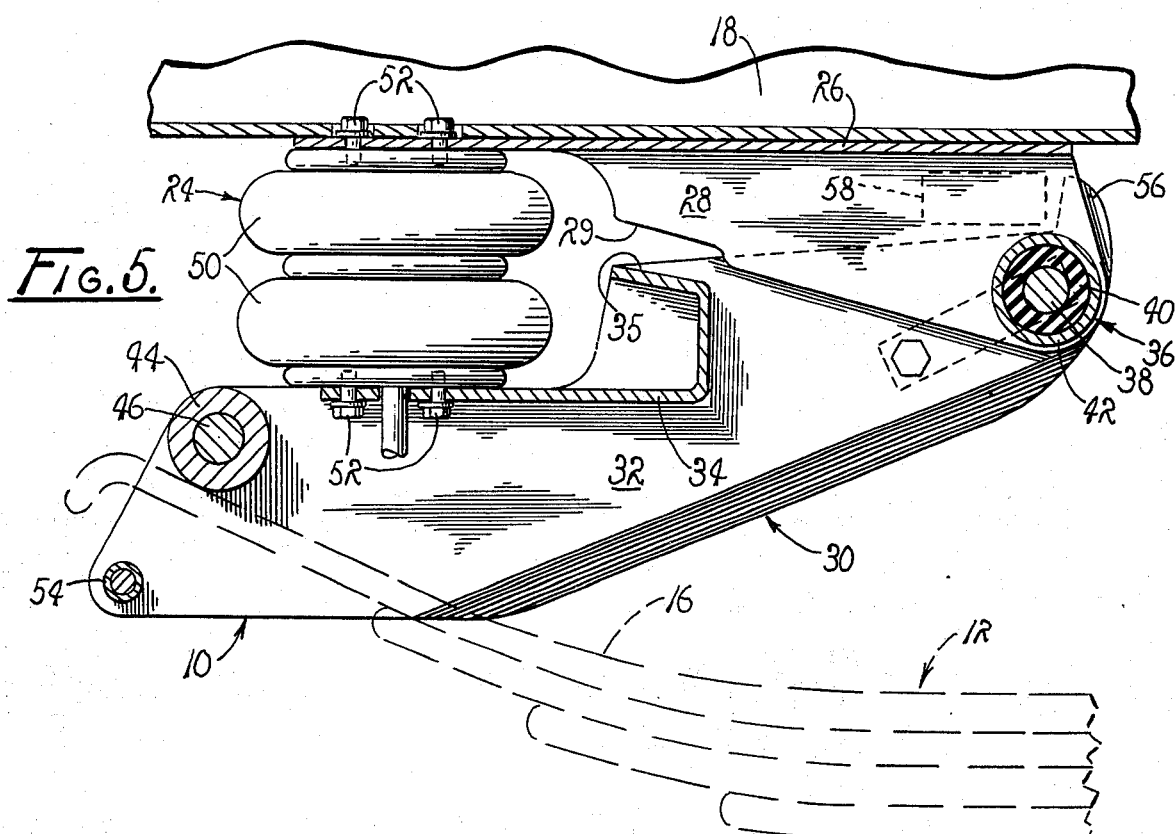
FIGS. 5 and 6 are elevational views of the suspension system, illustrating the system in empty-ride and hard-ride configurations, respectively.

Interposed between the opposite end of the leaf-spring assembly 12 and the frame 18, there is an air-bag assembly, generally designated 24, which is responsive to changes in the weight of loads applied to the frame 18 of the vehicle for converting between hard-ride and empty-ride configurations. These configurations are more fully illustrated in FIGS. 5 and 6.

The air-bag assembly 24, as shown, includes a bracket 26 welded or otherwise rigidly secured to the frame 18 in substantially coplanar alignment with the spring member 16. As a practical matter, the bracket 26 is of an inverted U-shape cross-sectional configuration having a pair of mutually spaced, vertically oriented side plates 28. These plates are relieved to provide a pair of stop surfaces 29, the purposes of which will hereinafter become more fully understood.

Pivotally connected to the end of the bracket 26 nearest the hanger 20, there is a pivotal arm 30. The arm 30 also includes a pair of vertically oriented side plates 32. These plates are arranged in mutual parallelism and spaced apart a distance sufficient for receiving therebetween the pair of side plates 28 of the bracket 26. As a practical matter, the side plates 32 are joined together by a web of a distorted configuration. The web includes a base segment 34 and integral motion arresting segment 35 which extends between the side plates in substantial parallelism with the base plate. The purposes of the segments 34 and 35 of the web will hereinafter become more fully apparent.

In practice, the arm 30 is pivotally connected at one end thereof to the bracket 26 through a knuckle pin assembly 36 of a suitable design. As shown, the knuckle pin assembly 36 includes a knuckle pin 38 concentrically received within a bushing 40 which is, in turn, inserted into a sleeve 42 extended between and welded to the side plates 28 of the bracket 26 in coaxial alignment with a pair of coaxially aligned bores, not designated, extended through the side plates 28 and 32 of the bracket 26 and pivotal arm 30, respectively. Suitable keepers, not designated, are provided for securing the knuckle pin 38 in place against axial motion.

Near the end of the pivotal arm 30, opposite the knuckle pin assembly 36, there is provided a supporting roller 44. The roller 44 is of an elongated configuration and extends between the side plates 32 of the pivotal arm 30 and is mounted on a concentric bearing pin 46. The pin 46 is extended axially through the roller and received in a pair of axially aligned openings, not designated, provided in the side plates 32.

The roller 44 seats in rolling engagement upon the upper surface of the spring member 16. Thus, the end portion of the spring member 16, opposite the knuckle joint 22, acts on the roller 44 for imparting vertical support to the arm 30 by applying thereto a supporting force which tends to urge the arm to rotate in a direction for closing the distance between the roller 44 and the frame 18. It should here be appreciated that the effective lever length of the pivotal arm 30 remains substantially constant since the distance between the roller 44 and the knuckle pin assembly 36 remains substantially constant throughout the operation of the system.

Interposed between the pivotal arm 30 and the frame 18, in spaced relation with the knuckle pin assembly 36, there is an air bag 50 formed of a suitable elastomeric material. As illustrated, the air bag 50 is of a double-convolute configuration and seated on the base segment 34 of the web which serves to interconnect the side plates 32 of the arm 30. Of course, an air bag of a single convolute configuration can be employed equally as well.

Since air bags employed as air springs are of known design, and are commercially available from various sources, a detailed description of the air bag 50 is omitted in the interest of brevity. However, it is to be understood that the air bag 50 is affixed to the web segment 34, and the bracket 26 through suitable fasteners, including bolts and the like, designated 52, threaded into disk-shaped supporting plates affixed to the air bag at each of its ends.

As a practical matter, the air bag 50 is connected with a pneumatic circuit particularly suited for delivering air under pressure to the bag from a given source. Since such circuits are well known, a detailed description thereof is omitted. Where desired, it should be appreciated that a pressure control valve is incorporated in the circuit and employed at all times for maintaining pressure within the air bag 50 substantially constant.

Figure 6:
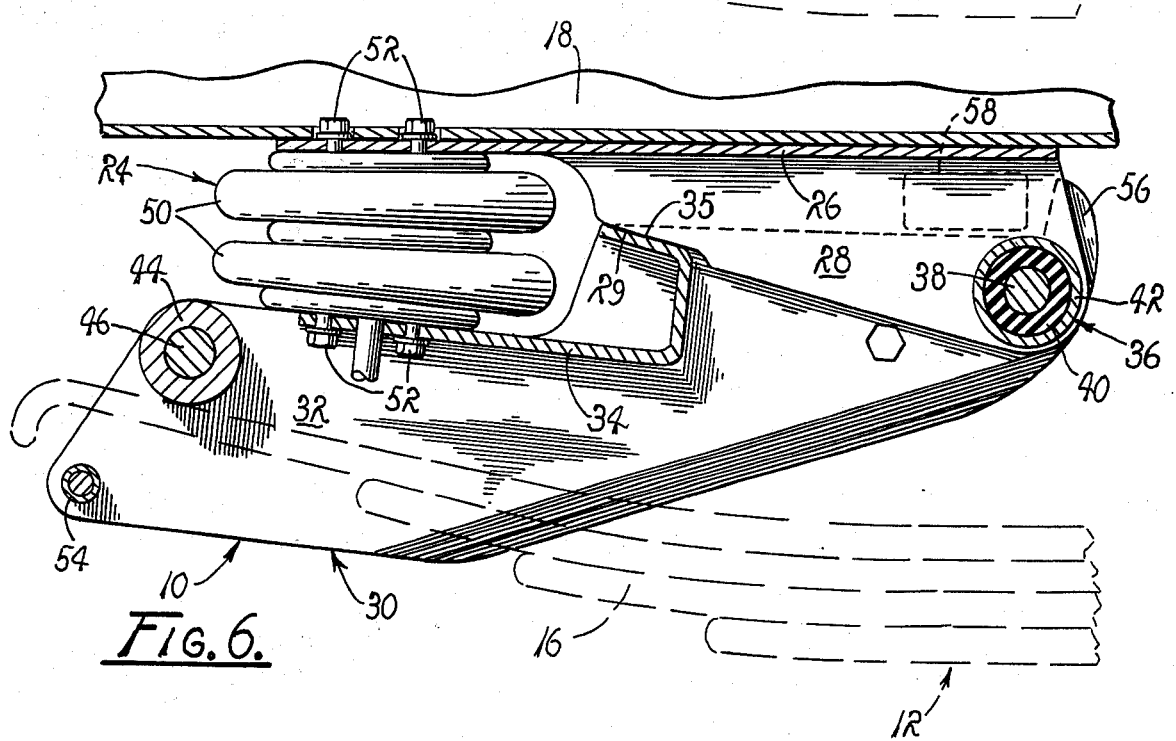

As illustrated in FIG. 6, the air bag 50 achieves a collapsed state in response to a sufficient closing of the distance between the arm 30 and the bracket 26. When the air bag 50 becomes sufficiently collapsed, the motion arresting segment 35 of the web extended between the plates 32 engages the pair of stop surfaces 29. Of course, once the motion arresting segment 35 of the web engages the stop surfaces 29, the weight of the load is distributed between the knuckle pin assembly 36 and the motion arresting segment 35. Thus, a hard-ride configuration for the suspension system is established.

In order to prevent the spring member 16 from being separated from the pivotal arm 30, as the vehicle, upon which the system 10 is mounted, is caused to bounce due to high speed travel along the surface of a highway, a rebound bar 54 is extended between the side plates 32. This bar serves as a keeper for the end of spring member 16. Furthermore, in order to limit the downward throw of the arm 30, each of the side plates 32 is provided with an upstanding ear 56, adjacent the knuckle pin assembly 36, arranged in opposition to a stop lug 58, which is welded or otherwise rigidly affixed to one of the side plates 28. These ears serve to engage the stop lugs for limiting the downward throw of the arm 30.

OPERATION

It is believed that in view of the foregoing description, the operation of the system will readily be understood and it will be briefly reviewed at this point.

In operation, a vehicle equipped with a suspension system 10, which embodies the principles of the instant invention, may be loaded sufficiently for causing the pivotal arm 30 to advance about the axis of the knuckle pin 38 through a distance sufficient for causing the air bag 50 to collapse. Where a pressure relief valve is included within the pneumatic system connected with the air bag 50, excess pressure is relieved from the bag. In any event, the bag 50 is thus collapsed and rendered substantially ineffective for supporting the load applied to the frame 18 of the vehicle. Consequently, the weight of the load is transferred to the leaf-spring assembly 12 through the knuckle pin assembly 36 and the motion arresting segment 35 of the web extended between the plates 32. This weight of the load is transferred through the knuckle pin assembly 36 and the arresting segment 35 of the web to the roller 44 and thence to the spring member 16. Thus, the suspension system is caused to assume a hard-ride configuration wherein the air bag 50 is substantially shielded from fatigue inducing shock loading.

However, once the load is removed from the frame 18 expansion of the air bag 50 is permitted, whereupon the suspension system 10 assumes an empty-ride configuration wherein the air bag 50 is sufficiently expanded, under the influence of residual pressure, to support the frame 18 in substantial isolation from shock loads resulting from highway induced vibratory motion imparted to the suspension 10.

Although the invention has been herein shown and described in what is conceived to be the most practical and preferred embodiment, it is recognized that departures may be made therefrom within the scope of the invention, which is not to be limited to the illustrative details disclosed.

Having described our invention, what we claim as new and desire to secure by Letters Patent is:

1. In a vehicle suspension system for a vehicle having a frame, an axle, a leaf spring assembly disposed beneath said frame and mounted on said axle in transverse relation therewith, and a collapsible air bag interposed between said leaf spring assembly and said frame, the improvement comprising:
   A. a bracket of an inverted U-shaped cross sectional configuration disposed above said leaf spring assembly and rigidly affixed to said frame;
   B. a pivotal arm of an elongated configuration arranged in substantially coplanar relation with said leaf spring assembly having a first end portion pivotally connected to said bracket and a second end portion interposed between the leaf spring assembly and said bracket;
   C. means for connecting said air bag with the second end portion of said arm and with said frame;
   D. bearing means affixed to the second end portion of said arm in spaced relation with the first end portion of said arm seated on said leaf spring assembly in a supported relationship therewith;
   E. load supporting means including first stop means defining motion arresting surfaces on said bracket above said arm in spaced relation with the first end portion thereof, and second stop means defining a motion arresting surface on said arm in spaced relation with the first end portion thereof for engaging said first stop means in a load supporting relationship therewith in response to a collapse of said air bag; and
   F. motion limiting means including a stop lug rigidly affixed to said bracket adjacent the first end portion of said arm, and an upstanding ear projected from the first end portion of said arm for engaging said stop lug for arresting pivotal motion of said arm in response to expansion of said air bag.

* * * * *

UNITED STATES PATENT AND TRADEMARK OFFICE
CERTIFICATE OF CORRECTION

PATENT NO. : 3,970,293
DATED : July 20, 1976
INVENTOR(S) : Philip J. Sweet, Buck C. Hamlet, David L. Sweet It is certified that error appears in the above-identified patent and that said Letters Patent are hereby corrected as shown below:

Abstract, Line 14,
delete "armin" and insert --- arm in ---.

Signed and Sealed this

Fourteenth Day of September 1976

[SEAL]

Attest:

RUTH C. MASON
*Attesting Officer*

C. MARSHALL DANN
*Commissioner of Patents and Trademarks*